United States Patent
Winzer et al.

(10) Patent No.: US 9,077,482 B2
(45) Date of Patent: Jul. 7, 2015

(54) HIGH-THROUGHPUT ROUTING IN AN OPTICAL NETWORK HAVING A MESH TOPOLOGY

(71) Applicants: Peter J. Winzer, Aberdeen, NJ (US); Kodialam Murali, Marlboro, NJ (US); Tirunell V. Lakshman, Marlboro, NJ (US)

(72) Inventors: Peter J. Winzer, Aberdeen, NJ (US); Kodialam Murali, Marlboro, NJ (US); Tirunell V. Lakshman, Marlboro, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 190 days.

(21) Appl. No.: 13/852,328

(22) Filed: Mar. 28, 2013

(65) Prior Publication Data

US 2014/0294392 A1    Oct. 2, 2014

(51) Int. Cl.
| | | |
|---|---|---|
| *H04J 14/02* | (2006.01) | |
| *H04L 12/721* | (2013.01) | |
| *H04L 12/715* | (2013.01) | |
| *H04L 12/727* | (2013.01) | |

(52) U.S. Cl.
CPC ......... *H04J 14/0284* (2013.01); *H04J 14/0201* (2013.01); *H04J 14/0227* (2013.01); *H04J 14/0257* (2013.01); *H04J 14/0267* (2013.01); *H04L 45/62* (2013.01); *H04L 45/64* (2013.01); *H04L 45/121* (2013.01)

(58) Field of Classification Search
CPC .............. H04J 14/0284; H04J 14/0201; H04J 14/0227; H04J 14/0257; H04J 14/0267; H04L 45/62; H04L 45/64; H04L 45/121
See application file for complete search history.

(56) References Cited

U.S. PATENT DOCUMENTS

| | | | |
|---|---|---|---|
| 6,950,450 B2 | 9/2005 | Simsarian et al. | |
| 7,286,771 B2 | 10/2007 | Helbing et al. | |
| 7,343,066 B2 | 3/2008 | Doerr et al. | |
| 7,359,384 B2 | 4/2008 | Kodialam et al. | |
| 7,489,638 B2 | 2/2009 | Keslassy et al. | |
| 7,733,929 B2 | 6/2010 | Sasada et al. | |
| 7,864,757 B2 | 1/2011 | Hall et al. | |
| 7,965,950 B2 | 6/2011 | Childers et al. | |
| 8,041,213 B2 | 10/2011 | Nakano | |

(Continued)

OTHER PUBLICATIONS

Rahbar, A. G., et al., "Agile bandwith management techniques in slotted all-optical packet switched networks," Computer Networks, Elsevier Science Publishers B.V., Amsterdam, NL, Feb. 26, 2010, pp. 387-403.

(Continued)

*Primary Examiner* — Leslie Pascal
(74) *Attorney, Agent, or Firm* — Mendelsohn, Drucker, & Dunleavy, P.C.; Yuri Gruzdkov

(57) ABSTRACT

An optical routing scheme in which an optical network having a mesh topology is configured to route optical packets through an optical routing layout superimposable with the mesh topology, but having a star-like topology. Using this routing layout, the optical network can be configured to transport optical packets from respective ingress nodes, through the hub node located at the star center, to respective egress nodes in a manner that enables a data throughput that approaches the theoretical capacity. No special hardware is required for implementing the hub functionality, and any node of the optical network can be configured to serve as the hub node. The latter feature enables relatively straightforward optimization of the optical routing layout and transmission schedule, e.g., by changing the identity of the hub node and adjusting the transmission schedule at the ingress nodes to synchronize packet arrivals to the hub node.

21 Claims, 5 Drawing Sheets

(56) References Cited

U.S. PATENT DOCUMENTS

| | | | |
|---|---|---|---|
| 8,089,959 B2 | 1/2012 | Szymanski | |
| 8,126,330 B2 | 2/2012 | Wisseman | |
| 8,190,027 B2 | 5/2012 | Boduch et al. | |
| 8,223,803 B2 | 7/2012 | Sprague | |
| 8,300,995 B2 | 10/2012 | Colbourne | |
| 8,391,709 B2 | 3/2013 | Colbourne et al. | |
| 2002/0095493 A1* | 7/2002 | Byrnes | 709/224 |
| 2005/0169172 A1* | 8/2005 | Wang et al. | 370/229 |
| 2007/0153845 A1 | 7/2007 | Bernasconi et al. | |
| 2009/0103453 A1* | 4/2009 | Hand et al. | 370/254 |
| 2009/0116464 A1* | 5/2009 | Hunkeler et al. | 370/338 |
| 2009/0286540 A1* | 11/2009 | Huber et al. | 455/435.1 |
| 2011/0229137 A1 | 9/2011 | Gripp et al. | |
| 2012/0163234 A1* | 6/2012 | Sulc | 370/254 |
| 2012/0170932 A1 | 7/2012 | Chu et al. | |
| 2013/0109406 A1* | 5/2013 | Meador et al. | 455/456.1 |
| 2013/0197955 A1* | 8/2013 | Dillon | 705/7.13 |

OTHER PUBLICATIONS

Rahbar, A. G., et al., "An integrated TDM architecture for AAPN Networks," Proceedings of Spie—The International Society for Optical Engineering 2000, vol. 5970, Sep. 28, 2005, pp. 1-8.

Li, J., et al., "Enhanced Birkhoff-von Neumann decomposition algorithm for input queued switches," IEE Proceedings—Communications, vol. 148, No. 6, pp. 339-342, Dec. 2001.

Chang, C. S., et al., "Load balanced Birkhoff-von Neumann switches, part I: one-stage buffering, Computer Communications", vol. 25, Issue 6, Apr. 1, 2002, pp. 611-622.

Peng, Cheng, et al., "Quick Birkhoff-von Neumann Decomposition Algorithm for Agile All-Photonic Network Cores," IEEE International Conference on Communications, vol. 6, pp. 2593-2598, Jun. 2006.

Widjaja, I., et al., "Light core and intelligent edge for a flexible, thin-layered, and cost-effective optical transport network," IEEE Communications Magazine, vol. 41, No. 5, pp. S30-S36, May 2003.

Qin, Yang, et al., "A topology based dynamic traffic scheduling in time-domain wavelength interleaved networks," Proceedings. 12th IEEE International Conference on Networks, vol. 1, pp. 142-146, Nov. 16-19, 2004.

Sundararajan, J.K., et al., "Extending the Birkhoff-von Neumann switching strategy for multicast—On the use of optical splitting in switches," IEEE Journal on Selected Areas in Communications, vol. 25, No. 6, pp. 36-50, Aug. 2007.

Chou, J., et al., Birkhoff-von Neumann switching with statistical traffic profiles, Computer Communications, vol. 33, Issue No. 7, May 3, 2010, pp. 848-851.

Simsarian, J.E., et al., "Fast-tuning 224-Gb/s intradyne receiver for optical packet networks," Optical Fiber Communication (OFC), Conference on Collocated National Fiber Optic Engineers (OFC/NFOEC), pp. 1-3, Mar. 21-25, 2010.

* cited by examiner

$$\begin{array}{c} {}_i\diagdown{}^j \end{array} \begin{array}{ccc} 1 & 2 & 8 \end{array}$$

$$\begin{pmatrix} 0 & 0.33 & 0.66 \\ 0.66 & 0 & 0.33 \\ 0.33 & 0.66 & 0 \end{pmatrix} = R$$

with row labels 1, 2, 8.

$$\begin{array}{c} {}_i\diagdown{}^j \end{array} \begin{array}{ccc} 1 & 2 & 8 \end{array}$$

$$\begin{pmatrix} 0 & 1 & 2 \\ 2 & 0 & 1 \\ 1 & 2 & 0 \end{pmatrix} = T$$

with row labels 1, 2, 8.

$$\begin{pmatrix} 0 & 0 & 1 \\ 1 & 0 & 0 \\ 0 & 1 & 0 \end{pmatrix} + \begin{pmatrix} 0 & 0 & 1 \\ 1 & 0 & 0 \\ 0 & 1 & 0 \end{pmatrix} + \begin{pmatrix} 0 & 1 & 0 \\ 0 & 0 & 1 \\ 1 & 0 & 0 \end{pmatrix}$$

$$= P_1 \qquad\qquad = P_2 \qquad\qquad = P_3$$

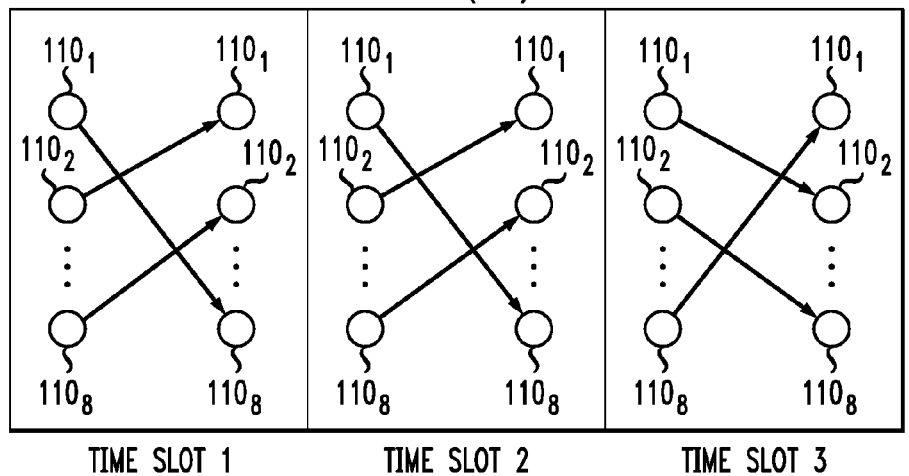

HIGH-THROUGHPUT ROUTING IN AN OPTICAL NETWORK HAVING A MESH TOPOLOGY

BACKGROUND

1. Field

The present disclosure relates to optical communication equipment and, more specifically but not exclusively, to scheduling packet transmissions in an optical network having a mesh topology.

2. Description of the Related Art

This section introduces aspects that may help facilitate a better understanding of the invention(s). Accordingly, the statements of this section are to be read in this light and are not to be understood as admissions about what is in the prior art or what is not in the prior art.

Optical burst switching and related optical packet-switching technologies can be implemented using an optical network having nodes equipped with wavelength-tunable transmitters, wavelength-tunable receivers, and wavelength-selective switches. To implement efficient packet-transmission scheduling in such an optical network, the network controller needs to assign slots in the time/wavelength plane to node-to-node connections in a manner that satisfies the traffic demand and, if necessary, causes the achieved data throughput to be relatively close to the maximum theoretical throughput. However, in an optical network having a generic mesh topology, this type of scheduling is relatively difficult to realize, for example, because, in contrast to a clocked packet switch, a packet-switched network exhibits randomly different delays for any pair of ingress/egress nodes.

SUMMARY OF SOME SPECIFIC EMBODIMENTS

At least some of the above-indicated problems are addressed by an optical routing scheme in which an optical network having a mesh topology is configured to route optical packets through an optical routing layout superimposable with the mesh topology but having a star-like topology instead of the mesh topology. Using this optical routing layout, the optical network can be configured to transport optical packets from respective ingress nodes, through the hub node located at the star center, to respective egress nodes in a manner that enables a realizable data throughput that can closely approach the maximum theoretical capacity. Advantageously, no special hardware in addition to a wavelength-tunable transmitter, a wavelength-tunable receiver, and a wavelength-selective switch is required for the node to be amenable to the hub functionality, and any node of the optical network can in principle be configured to serve as the hub node. The latter feature enables relatively straightforward optimization of the optical routing layout and transmission schedule, e.g., by changing the identity of the putative hub node and individually time-shifting the transmission schedules at various ingress nodes to synchronize packet arrivals to the hub node.

According to one embodiment, provided is a method of routing optical signals in an optical network having a mesh topology, the method comprising: (A) generating an optical routing layout superimposable with the mesh topology of the optical network, said optical routing layout having a hub node and being configured to route any optical packet from a respective ingress node to a respective egress node via the hub node; and (B) generating, based on arrival traffic rates, a transmission schedule for transmitting optical packets, through the optical routing layout, from the respective ingress nodes to the respective egress nodes.

According to another embodiment, provided is a non-transitory machine-readable medium, having encoded thereon program code, wherein, when the program code is executed by a controller of an optical network having a mesh topology, the controller implements the above-specified method of routing optical signals in said optical network.

According to yet another embodiment, provided is an optical network comprising a plurality of nodes connected to one another by a plurality of optical-transport links arranged according to a mesh topology, wherein: each node of the plurality of nodes is configurable to function as an ingress node and as an egress node; and at least some nodes of the plurality of nodes are configurable to function as relay nodes. The optical network further comprises a network controller operatively connected to the plurality of nodes and configured to: generate an optical routing layout superimposable with the mesh topology of the optical network, said optical routing layout having a hub node and being configured to route any optical packet from a respective ingress node to a respective egress node via the hub node; and generate, based on arrival traffic rates, a transmission schedule for transmitting optical packets, through the optical routing layout, from the respective ingress nodes to the respective egress nodes.

BRIEF DESCRIPTION OF THE DRAWINGS

Various embodiments of the invention(s) disclosed herein will become more fully apparent, by way of example, from the following detailed description and the accompanying drawings, in which:

FIGS. 4A-4F show an example that illustrates the processing performed at certain steps of the method shown in FIG. 2 according to an embodiment of the disclosure.

DETAILED DESCRIPTION

Figure 1:
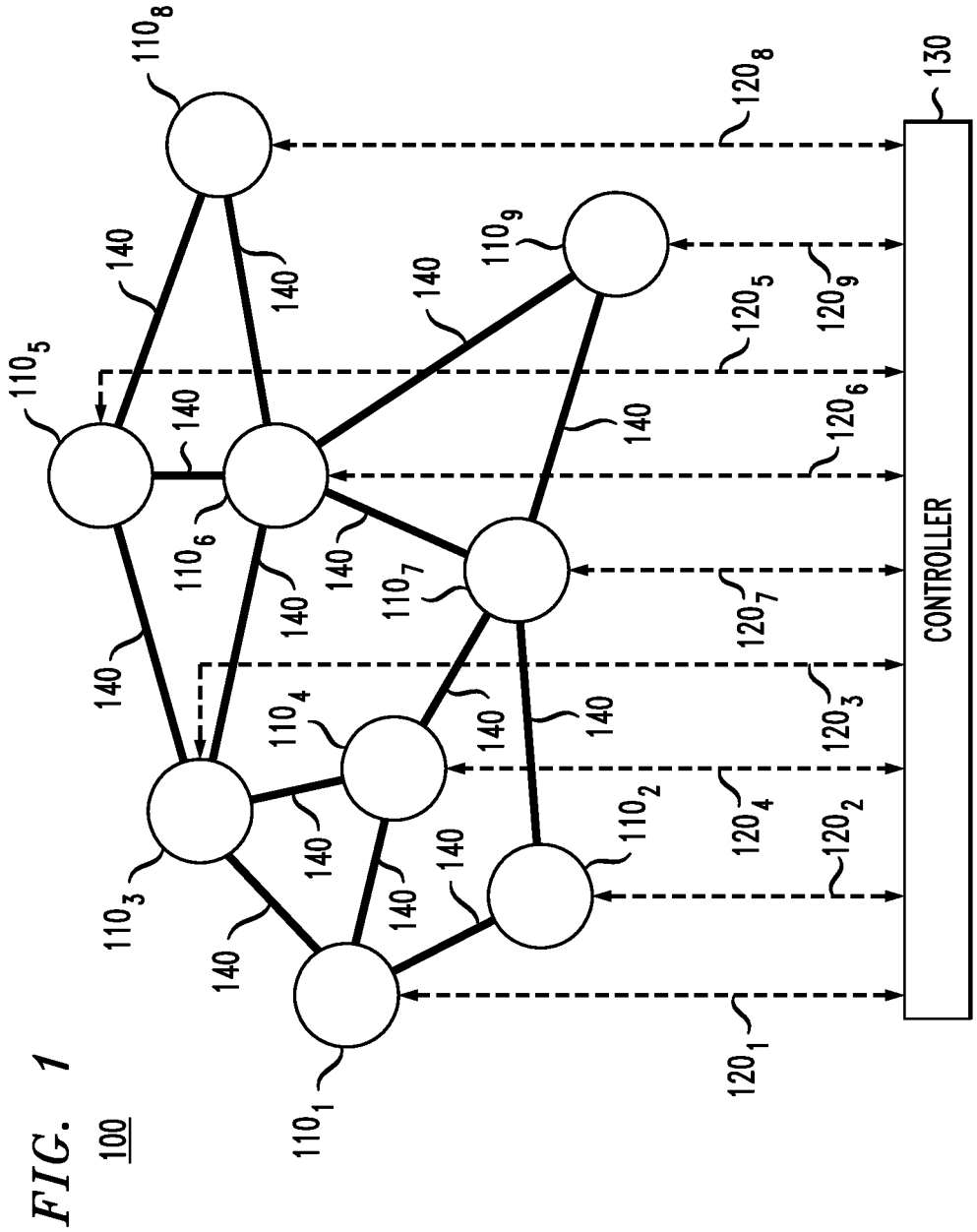
FIG. 1 shows a block diagram of an optical network in which various disclosed embodiments can be practiced.

FIG. 1 shows a block diagram of an optical network 100 in which various disclosed embodiments can be practiced. Optical network 100 is illustratively shown as comprising nine nodes $110_1$-$110_9$ and a network controller 130. Each node $110_i$ is connected to controller 130 via a corresponding control link 120, where i=1, 2, ..., 9. Controller 130 uses control links 120 to configure nodes 110 to generate optical packets and appropriately direct each optical packet, via optical-transport links 140, from a corresponding ingress node $110_i$ to a corresponding egress node $110_j$, where j=1, 2, ..., 9 and j≠i. In one embodiment, each of nodes $110_1$-$110_9$ can operate as an ingress node, as a relay node, and as an egress node. Each control link $120_i$ can be a wireline link, a wireless link, an optical link, or any combination thereof. Each optical transport link 140 can be implemented using a suitable optical fiber or fiber-optic cable.

Optical network 100 has a partial mesh topology, in which each node $110_i$ is directly connected to only some of nodes $110_j$, where i≠j. However, various embodiments disclosed herein are not limited only to partial mesh topologies. For example, at least some embodiments can be adapted for an optical network having the full mesh topology, in which each node $110_i$ is directly connected to each of nodes $110_j$, where i≠j. In various alternative embodiments, optical network 100 can have more or fewer than nine nodes 110 connected to one another using the corresponding full mesh topology or any desired partial mesh topology.

When functioning as an ingress node, node $110_i$ operates to: (i) receive data from an external source via a corresponding peripheral link (not explicitly shown in FIG. 1); (ii) if necessary, (re)packetize the received data; (iii) modulate a carrier wavelength using the packetized data; and (iv) apply the resulting modulated optical signal to an appropriate one of optical-transport links 140. Suitable hardware for implementing these optical-transmitter functions in a node $110_i$ is disclosed, e.g., in U.S. Pat. Nos. 7,733,929, 7,286,771, and 6,950,450 and U.S. Patent Application Publication No. 2007/0153845, all of which are incorporated herein by reference in their entirety.

When functioning as an egress node, node $110_i$ operates to: (i) receive a modulated optical signal from a corresponding optical-transport link 140; (ii) demodulate and decode the received modulated optical signal to recover the data; and (iii) direct the recovered data to an external destination via a corresponding peripheral link (not explicitly shown in FIG. 1). Suitable hardware for implementing these optical-receiver functions in a node $110_i$ is disclosed, e.g., in U.S. Pat. No. 7,965,950 and U.S. Patent Application Publication No. 2011/0229137, both of which are incorporated herein by reference in their entirety.

When functioning as a relay node, node $110_i$ operates to receive a modulated optical signal via one optical-transport link 140 and then directs this optical signal into one or more other optical-transport links 140, e.g., using a wavelength-selective switch (WSS). Suitable hardware for implementing these switching/relay functions in node $110_i$ is disclosed, e.g., in U.S. Pat. Nos. 8,391,709, 8,300,995, 8,190,027, 8,126,330, 8,041,213, and 7,343,066, all of which are incorporated herein by reference in their entirety.

As known in the relevant art, a WSS can be configured to operate as a reconfigurable optical add/drop multiplexer (ROADM). The use of WSSs therefore enables integration, in each node $110_i$, of the abovementioned optical-transmitter, optical-receiver, and signal-relay functions.

In one embodiment, a node $110_i$ can be configured to operate as follows.

To generate a modulated optical signal while functioning as an ingress node, node $110_i$ uses the received data, e.g., temporarily stored in an input buffer (not shown in FIG. 1), to modulate in a conventional manner a carrier wavelength ($\lambda_i$) assigned to that node by controller 130. A corresponding WSS functioning as a ROADM in node $110_i$ then adds the generated optical signal to the signal multiplex in the appropriate optical transport link 140. Each different node $110_i$ is assigned a different respective carrier wavelength $\lambda_i$, e.g., selected from a wavelength (frequency) grid defined by the ITU Recommendation G.694.1, which is incorporated herein by reference in its entirety. The assigned wavelength $\lambda_i$ identifies the wavelength of optical signals originating at that corresponding node $110_i$. Whenever another node $110_j$ needs to receive an optical signal that originated at node $110_i$, the node's receiver is tuned to the corresponding assigned wavelength $\lambda_i$. The assigned wavelengths remain fixed for the duration of a routing session, e.g., until controller 130 performs a reassignment of carrier wavelengths in network 100.

To receive a modulated optical signal while functioning as an egress node, node $110_i$ tunes its receiver at the appropriate time slot(s), e.g., within a periodic routing schedule, to the expected carrier wavelength of that optical signal. The carrier wavelengths that should be expected by each node $110_i$ at different time slots are communicated to the node, via control link $120_i$, by controller 130 based on the routing schedule, which is developed and maintained thereat, e.g., as further described below. The routing schedule specifies, inter alia, the source node and the destination node of each optical packet. As indicated above, the identity of the source node unambiguously determines the carrier wavelength of the optical packet, which is communicated by controller 130 to the corresponding destination node to enable appropriate tuning of the node's receiver. In different time slots, each node $110_i$ can tune its receiver to a different respective carrier wavelength $\lambda_j$, where i≠j, to enable reception of optical packets generated by different respective ingress nodes in accordance with the routing schedule.

To relay an optical signal while functioning as a relay node, node $110_i$ configures its WSS to appropriately redirect the optical signal from one optical transport link 140 to one or more other optical transport links 140. The corresponding switching schedule for the WSS is determined based on the routing schedule maintained at controller 130 and communicated to node $110_i$ via control link $120_i$.

Figure 2:
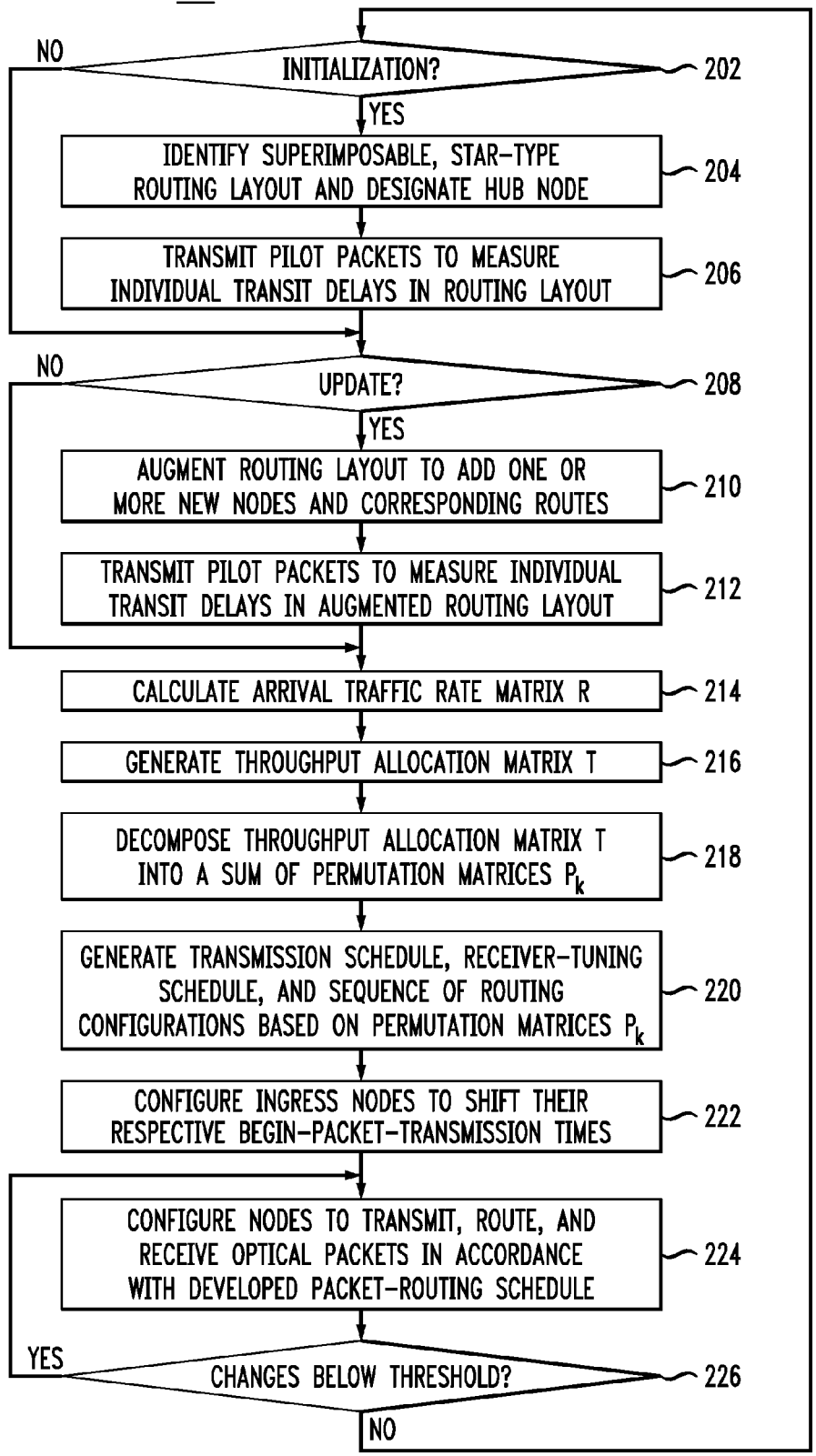
FIG. 2 shows a flowchart of a method that can be used for routing optical signals in the optical network shown in FIG. 1 according to an embodiment of the disclosure.

FIG. 2 shows a flowchart of a method 200 that can be used for routing optical signals in optical network 100 (FIG. 1) according to an embodiment of the disclosure. One of ordinary skill in the art will appreciate that various embodiments of method 200 can also be practiced in an optical network which is generally analogous to optical network 100 (FIG. 1) but has a different mesh topology and/or a different number of nodes. Various steps of method 200 are further illustrated by and explained in reference to FIGS. 3-4.

The steps of method 200 can illustratively be divided into the following three groups: (I) initialization tasks; (II) a configuration update that can be performed whenever a new node is added to the optical network; and (III) traffic-scheduling tasks. Group I includes steps 202-206. Group II includes steps 208-212. Group III includes steps 214-226.

Method 200 begins at step 202, where a decision is made on whether or not to perform initialization tasks. As indicated above, the initialization tasks are usually performed when optical network 100 is being configured to implement method 200 for the first time. The initialization tasks may also be performed, e.g., after link/node failures, system repairs, and/or system upgrades, or when the system is being rebooted, or for any other justifiable reason. If the initialization tasks need to be performed, then the processing of method 200 is directed to step 204. Otherwise, the initialization tasks are bypassed and the processing of method 200 is directed to step 208.

At step 204, the present mesh topology of optical network 100 is analyzed to (i) find a suitable superimposable, star-type routing layout and (ii) designate one of nodes 110 as the routing-layout's hub node located at the star center. One characteristic of a superimposable, star-type routing layout is that, en route from any ingress node $110_i$ to any egress node $110_j$, any packet passes through the hub node, when neither the ingress node nor the egress node is the hub node. Another characteristic of a superimposable, star-type routing layout is that the packet-transit delay ($\delta_{ij}$) for optical-packet transit from any ingress node $110_i$ to any egress node $110_j$ has a substantially fixed value that is separable into a sum of two other substantially fixed values in accordance with Eq. (1):

$$\delta_{ij} = u_i + v_j \qquad (1)$$

where $u_i$ is the packet-transit delay from ingress node $110_i$ to the hub node, and $v_j$ is the packet-transit delay from the hub node to egress node $110_j$. Typically, the packet-transit delay $u_i+v_j$ is different for different ingress-egress node pairs. The use of the term "substantially fixed" reflects the fact that, in the presence of chromatic dispersion, packet-transit delays $v_j$ have a slight residual dependence on i because each wavelength $\lambda_i$ travels at a slightly different respective speed. Yet another characteristic of a superimposable, star-type routing layout is that the routing paths therein are not necessarily the shortest routing paths between the corresponding nodes, that some of the optical transport links 140 may be left out of the routing layout altogether (e.g., remain idle or disengaged during the corresponding routing session), and that some other transport links 140 may be traversed in both directions (e.g., in one direction on the way from the ingress node to the hub node, and in the other direction on the way from the hub node to the egress node).

In principle, any node 110 can be configured to serve as a hub node, and no special hardware in addition to the hardware described above in reference to FIG. 1 is required for implementing this function. In general, more than one superimposable, star-type routing layout may be able to be constructed for a given network topology, and one of these constructed layouts may be chosen for the actual use based on some auxiliary considerations, such as the average number of relay nodes per route, the routes' average physical length, etc.

Figure 3:
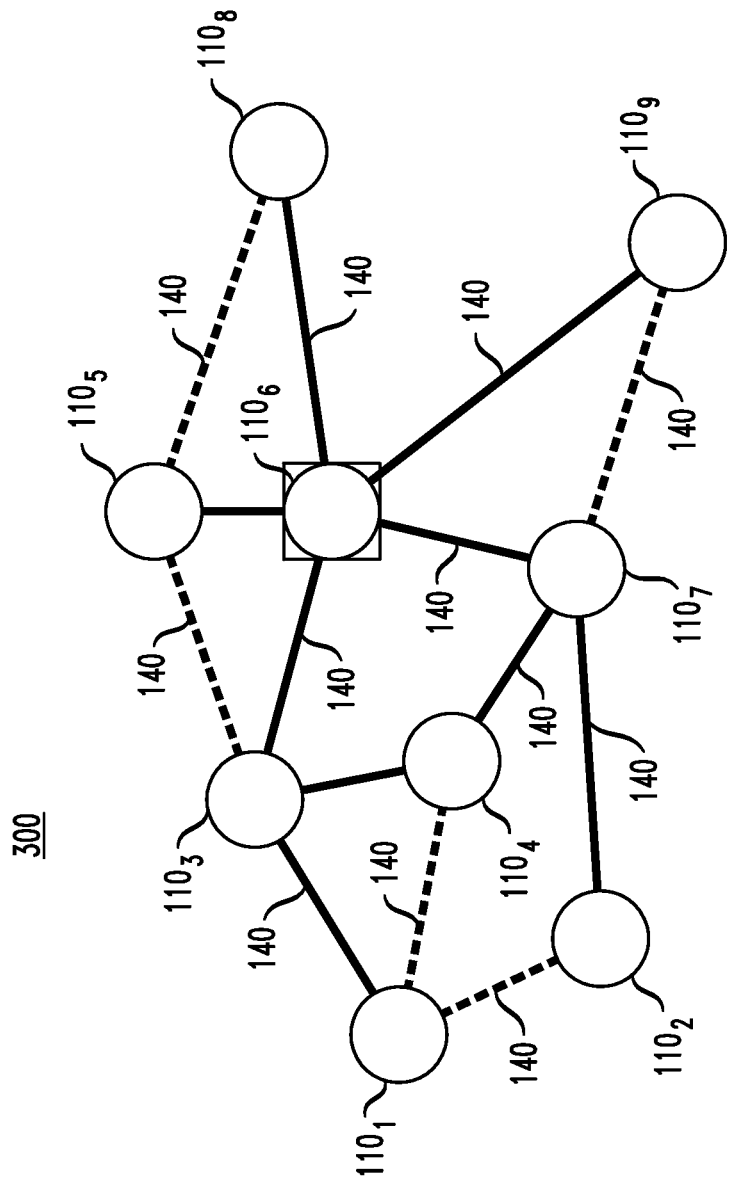
FIG. 3 shows a block diagram of a representative superimposable, star-type routing layout designed for the optical network shown in FIG. 1 using the method of FIG. 2 according to an embodiment of the disclosure.

FIG. 3 shows a block diagram of a representative superimposable, star-type routing layout 300 constructed for optical network 100 (FIG. 1) at step 204 of method 200 (FIG. 2) according to an embodiment of the disclosure. Node $110_6$ is chosen as the hub node in routing layout 300, as indicated by the square drawn around it in FIG. 3. Routing layout 300 is referred to as being "star-type" because not every node $110_j$, where $j \neq 6$, is directly connected to the hub node, but all packets are still routed to go through the hub node. Table 1 lists the routes used in routing layout 300 to route optical packets to/from various nodes $110_i$.

TABLE 1

Packet Routes Used in Routing Layout 300

| Node Index i | Route to Hub | Route from Hub |
| --- | --- | --- |
| 1 | 1 → 3 → 6 | 6 → 3 → 1 |
| 2 | 2 → 7 → 6 | 6 → 7 → 2 |
| 3 | 3 → 6 | 6 → 3 |
| 4 | 4 → 3 → 6 | 6 → 7 → 4 |
| 5 | 5 → 6 | 6 → 5 |
| 7 | 7 → 6 | 6 → 7 |
| 8 | 8 → 6 | 6 → 8 |
| 9 | 9 → 6 | 6 → 9 |

Inspection of Table 1 reveals that some of optical transport links 140 are not used in routing layout 300. These optical transport links 140 are shown in FIG. 3 by dashed lines. For example, when an optical packet needs to be transported from node $110_1$ to node $110_2$, the routing path that will be taken by the optical packet in routing layout 300 in accordance with Table 1 is as follows: 1→3→6→7→2. Thus, the direct optical transport link 140 between nodes $110_1$ and $110_2$ is bypassed in routing layout 300 in favor of a longer, but separable-delay route through the hub node (node $110_6$). Other optical transport links 140 that are bypassed in routing layout 300 for similar reasons are: (i) the optical transport link 140 between nodes $110_1$ and $110_4$; (ii) the optical transport link 140 between nodes $110_3$ and $110_5$; (iii) the optical transport link 140 between nodes $110_5$ and $110_8$; and (iv) the optical transport link 140 between nodes $110_7$ and $110_9$.

Further inspection of Table 1 reveals that the route taken by an optical packet in routing layout 300 from a node $110_i$ to the hub node and the route taken by an optical packet from the hub node to that same node $110_i$ do not have to be the same. An example of this possible directional asymmetry in routing layout 300 is the routes corresponding to node $110_4$ (see Table 1).

Each route from an ingress node to the hub node in routing layout 300 is wavelength-specific. This means that optical packets that originate at node $110_i$ have carrier wavelength $\lambda_i$ and are routed to hub node $110_6$ via a respective unique path indicated in the second column of Table 1. Thus, different carrier wavelengths are typically being routed to the hub node via different respective paths.

In contrast, each route from the hub node to an egress node in routing layout 300 is wavelength-blind. This means that any optical packet destined for node $110_j$ is routed to that node from hub node $110_6$ via a respective path indicated in the third column of Table 1 regardless of the carrier wavelength. Thus, different carrier wavelengths are being routed to a given egress node via the same (common) path.

Referring back to FIG. 2, at step 206, controller 130 configures the various nodes 110 in network 100 to transmit a series of pilot packets to measure the individual transit delays $u_i$ and $v_j$ (see Eq. (1)) for each pair of nodes $110_i$ and $110_j$ in routing layout 300. The measurement results are then saved in a memory accessible to controller 130 for future use. After the completion of step 206, the processing of method 200 is directed to step 208.

At step 208, a decision is made on whether or not to perform a configuration update due to an addition of one or more new nodes and/or one or more new optical transport links to the optical network. If the configuration update needs to be performed, then the processing of method 200 is directed to step 210. Otherwise, the processing of method 200 is directed to step 214.

At step 210, the operative routing layout, such as routing layout 300 (FIG. 3), is augmented to add routes corresponding to the new node(s)/link(s). For example, each new node is assigned a respective carrier wavelength and two routes, one for transporting optical packets from that new node to the hub node, and the other for transporting optical packets from the hub node to the new node. The corresponding routing table (such as Table 1) is then updated by adding a respective entry for each new node. Note that the augmentation of the operative routing layout can be performed at step 210 without changing the identity of the hub node.

At step 212, controller 130 configures the various nodes in the optical network to transmit a series of pilot packets to measure the individual transit delays $u_i$ and $v_j$ (see Eq. (1)) for each pair of nodes comprising a new node. The measurement results are then added to the results of step 206. After the completion of step 212, the processing of method 200 is directed to step 214.

An alternative to the configuration update performed at steps 210-212 is to execute a complete re-initialization through steps 204-206. For example, a configuration update through steps 210-212 may be preferred when the topological changes to the optical network are not too extensive, such as in the case of adding a single new node or link. On the other hand, a complete re-initialization through steps 204-206 may be preferred when the topological changes in the optical network are relatively severe. Unlike a configuration update through steps 210-212, a re-initialization through steps 204-

206 may result in changing the identity of the hub node, e.g., when such a change can produce some operational benefit for the optical network.

At step 214, controller 130 calculates an arrival traffic rate matrix, $R=(r_{ij})$, where each matrix element $r_{ij}$ represents the average normalized rate of subscribed traffic from node 110$_i$ to node 110$_j$. Rate matrix R can be calculated, e.g., based on the destination-specific rates of data flow into the input buffers of individual nodes 110 from the corresponding peripheral links. In general, an admissible rate matrix R satisfies the conditions expressed by Eqs. (2a) and (2b):

$$\sum_{i=1}^{N} r_{ij} \le 1, \quad j \quad (2a)$$

$$\sum_{j=1}^{N} r_{ij} \le 1, \quad i \quad (2b)$$

where N is the number of nodes in the optical network. In the example shown in FIGS. 1 and 3, N=9.

Note that Eqs. (2a) and (2b) correspond to an embodiment in which different nodes 110 have equal ingress/egress capacities that can be normalized to one. One of ordinary skill in the art will understand how to modify Eqs. (2a) and (2b) (and also Eqs. (3)-(4)) to describe an embodiment in which some nodes 110 have different respective ingress/egress capacities.

At step 216, controller 130 generates a throughput allocation matrix, $T=(T_{ij})$.

To generate matrix T, controller 130 first selects a packet size, p, and a frame size, F, compatible with the rate matrix R calculated at step 214. Packet size p is an integer representing the number of optical symbols per packet. Frame size F is an integer representing the number of time slots per frame, with each time slot being sufficiently long for transmission of a packet of size p. If packet size p is a fixed parameter, e.g., determined by the relevant standard or technical specification, then only the frame size is selected at step 216.

Then, using the selected value of F, controller 130 generates matrix T in accordance with the conditions expressed by Eqs. (3a)-(3c):

$$\sum_{i=1}^{N} T_{ij} \le F, \quad j \quad (3a)$$

$$\sum_{j=1}^{N} T_{ij} \le F, \quad i \quad (3b)$$

$$F \, r_{ij} \le T_{ij}, \quad i, j \quad (3c)$$

where each $T_{ij}$ is an integer.

At step 218, throughput allocation matrix T is decomposed into a sum of permutation matrices $P_k$ in accordance with Eq. (4):

$$T = \sum_{k=1}^{F} P_k \quad (4)$$

Each matrix element in each permutation matrix $P_k$ has a value of either zero or one, with the "ones" being arranged in the matrix so that there is at most a single "one" per row and a single "one" per column.

In one embodiment, the decomposition corresponding to Eq. (4) can be performed at step using a suitable Birkhoff-Von Neumann decomposition algorithm. Various Birkhoff-Von Neumann algorithms that can be used for this purpose are described, e.g., in U.S. Pat. Nos. 8,089,959, 7,359,384, 7,489,638, all of which are incorporated herein by reference in their entirety. As known in the art, the Birkhoff-Von Neumann decomposition corresponding to Eq. (4) may not be unique in terms of the resulting set of permutation matrices $P_k$. However, any set of permutation matrices $P_k$ that satisfies Eq. (4) can in principle be used in the subsequent steps of method 200 to create an acceptable routing schedule for the optical network.

At step 220, the permutation matrices $P_k$ are used to generate a transmission schedule, a receiver-tuning schedule, and a sequence of routing configurations for the optical network. More specifically, the transmission schedule determines the time slots in which the transmitters in different nodes are supposed to transmit data. The receiver-tuning schedule determines the carrier wavelengths, which the individual receivers in different nodes are supposed to tune to in each time slot. A routing configuration determines how the corresponding relay nodes are supposed to route different carrier wavelengths passing therethrough in each time slot.

The above-indicated properties of permutation matrices $P_k$ produce (i) a transmission schedule in which each node transmits (serves as an ingress node for) at most one packet and receives (serves as an egress node for) at most one packet per time slot and (ii) a sequence of routing configurations in which packet collisions are avoided and each node can appropriately relay all packets passing therethrough. Permutation matrix $P_1$ defines the transmitter, receiver, and routing configurations for different nodes in the first time slot of a frame. Permutation matrix $P_2$ defines the transmitter, receiver, and routing configurations for different nodes in the second time slot of a frame. Permutation matrix $P_3$ defines the transmitter, receiver, and routing configurations for different nodes in the third time slot of a frame. Permutation matrix $P_4$ defines the transmitter, receiver, and routing configurations for different nodes in the fourth time slot of a frame, etc. Each of the resulting transmission schedule, sequence of receiver configurations, and sequence of routing configurations is periodic with a period of F time slots (or frame size).

FIGS. 4A-4F show an example that illustrates the processing performed at steps 214-220 of method 200 according to an embodiment of the disclosure. More specifically, the example shown in FIGS. 4A-4F corresponds to F=3 and a traffic pattern in which only three out of nine nodes 110 in optical network 100 exchange optical packets in their capacity as ingress/egress nodes. Illustratively, these three nodes are nodes 110$_1$, 110$_2$, and 110$_8$. Nodes 110$_4$, 110$_5$, and 110$_9$ are idle in this example; and nodes 110$_3$, 110$_6$, and 110$_7$ operate as relay nodes.

FIG. 4A shows arrival traffic rate matrix R calculated at step 214 of method 200. This particular example of matrix R indicates a relatively high traffic volume from node 110$_1$ to node 110$_8$, from node 110$_2$ to node 110$_1$, and from node 110$_8$ to node 110$_2$, and a relatively low traffic volume from node 110$_1$ to node 110$_2$, from node 110$_2$ to node 110$_8$, and from node 110$_8$ to node 110$_1$.

FIG. 4B shows throughput allocation matrix T generated at step 216 of method 200 based on the arrival traffic rate matrix R shown in FIG. 4A. In this particular example, throughput allocation matrix T is produced by (i) multiplying the matrix elements of arrival traffic rate matrix R by a factor of three (the approximate common denominator of the fractional values shown in FIG. 4A) and (ii) rounding up the multiplication results. The resulting throughput allocation matrix T satisfies the conditions expressed by Eqs. (3a)-(3c) for F=3.

FIG. 4C shows the decomposition of the throughput allocation matrix T shown in FIG. 4B into a sum of permutation matrices $P_k$ in accordance with Eq. (4). This decomposition is generated at step 218 of method 200 using a Birkhoff-Von Neumann algorithm.

FIG. 4D shows the transmission schedule generated at step 220 of method 200 based on the permutation matrices $P_1$-$P_3$ shown in FIG. 4C. The matrix-element indices corresponding to each "one" in a permutation matrix determine a pair of transmitting/receiving nodes in the respective time slot of the frame. For example, the "ones" in permutation matrix $P_1$, which are located at (i=1, j=8), (i=2, j=1), and (i=8, j=2), define the transmission edges for the first time slot of a frame, as indicated in the left panel of FIG. 4D. The "ones" in permutation matrix $P_2$, which are located at (i=1, j=8), (i=2, j=1), and (i=8, j=2), define the transmission edges for the second time slot of a frame, as indicated in the center panel of FIG. 4D. The "ones" in permutation matrix $P_3$, which are located at (i=1, j=2), (i=2, j=8), and (i=8, j=1), define the transmission edges for the third time slot of a frame, as indicated in the right panel of FIG. 4D.

FIG. 4E shows the receiver-tuning schedule generated at step 220 of method 200 based on the transmission schedule shown in FIG. 4D. For example, in the first time slot, node $110_1$ is scheduled to receive an optical packet from node $110_2$. Node $110_1$ is therefore scheduled, as shown in the left panel of FIG. 4E, to tune its receiver to carrier wavelength $\lambda_2$ on which node $110_2$ transmits. Similarly, in the first time slot, node $110_2$ is scheduled to receive an optical packet from node $110_8$. Node $110_2$ is therefore scheduled, as shown in the left panel of FIG. 4E, to tune its receiver to carrier wavelength $\lambda_8$ on which node $110_8$ transmits, and so on.

FIG. 4F shows the sequence of routing configurations generated at step 220 of method 200 based on the transmission schedule shown in FIG. 4D, the star-type routing layout generated at step 204 of method 200, and the corresponding packet routes listed in Table 1. For example, in the first time slot, a respective optical packet having carrier wavelength $\lambda_1$ is routed as follows:

the WSS of node $110_1$ is configured to add the packet to the optical-transport link 140 that leads to node $110_3$;

the WSS of node $110_3$ is configured to redirect the packet to the optical-transport link 140 that leads to hub node $110_6$;

the WSS of hub node $110_6$ is configured to redirect the packet to the optical-transport link that leads to node $110_3$; and node $110_8$ is configured to direct the received packet to the node's receiver, which has been tuned to carrier wavelength $\lambda_1$ in accordance with the portion of the receiver-tuning schedule shown in the left panel of FIG. 4E.

As another example, in the third time slot, a respective optical packet having carrier wavelength $\lambda_1$ is routed as follows:

the WSS of node $110_1$ is configured to add the packet to the optical-transport link 140 that leads to node $110_3$;

the WSS of node $110_3$ is configured to redirect the packet to the optical-transport link 140 that leads to hub node $110_6$;

the WSS of hub node $110_6$ is configured to redirect the packet to the optical-transport link that leads to node $110_7$;

the WSS of node $110_7$ is configured to redirect the packet to the optical-transport link 140 that leads to node $110_2$; and node $110_2$ is configured to direct the received packet to the node's receiver, which has been tuned to carrier wavelength $\lambda_1$ in accordance with the portion of the receiver-tuning schedule shown in the right panel of FIG. 4E.

As yet another example, in the first time slot, a respective optical packet having carrier wavelength $\lambda_8$ is routed as follows:

the WSS of node $110_8$ is configured to add the packet to the optical-transport link 140 that leads to hub node $110_6$;

the WSS of hub node $110_6$ is configured to redirect the packet to the optical-transport link 140 that leads to node $110_7$;

the WSS of node $110_7$ is configured to redirect the packet to the optical-transport link 140 that leads to node $110_2$; and node $110_2$ is configured to direct the received packet to the node's receiver, which has been tuned to carrier wavelength $\lambda_8$ in accordance with the portion of the receiver-tuning schedule shown in the left panel of FIG. 4E.

Referring back to FIG. 2, step 222 of method 200 is optional and is directed at increasing the data throughput of the corresponding star-type routing layout (such as layout 300 of FIG. 3) by enabling the use of shorter guard intervals than those used when this step is omitted. More specifically, step 222 enables optical network 100 to synchronize the arrival of optical packets transmitted in the same time slot to hub node $110_6$, where the traffic density and the probability of packet collisions are at their highest.

When step 222 is omitted, different optical packets originating at different ingress nodes arrive to hub node $110_6$ at slightly different times owing to different respective transit delays $u_i$ (see Eq. (1)). As a result, the duration of the guard interval between different time slots of a frame has to be set to a relatively large value that accommodates these time-of-arrival differences and enables proper switching of the WSS in the hub node between the time slots.

Step 222 takes advantage of the fact that the set of transit delays $u_i$ in the star-type routing layout is known and fixed (see steps 206 and 212). Hence, at step 222, the various ingress nodes $110_i$ in optical network 100 can be configured to shift their respective begin-packet-transmission times, $t_i$, in accordance with Eq. (5):

$$t_i = t_r - u_i \quad (5)$$

where $t_r$ is the time-slot's reference time common to all nodes. These time shifts effectively cancel the time-of-arrival differences at hub node $110_6$, thereby enabling the use of relatively short guard intervals between time slots of a frame.

In some embodiments, step 222 can also be used to take into account the effect of chromatic dispersion on transit times of the hub-to-egress leg of a route. For example, if $v_j$ values differ for carrier wavelengths $\lambda_i$ and $\lambda_k$ such that carrier wavelength $\lambda_i$ is faster than carrier wavelength $\lambda_k$ by time $\Delta t_{ik}$, where j corresponds to the longest among all hub-to-egress legs, then $t_i$ can be delayed by time $\Delta t_{ik}/2$ while $t_k$ can be advanced by $\Delta t_{ik}/2$. The result would be an approximate equalization of the effect of chromatic dispersion for carrier wavelengths $\lambda_i$ and $\lambda_k$ and a reduction in the amount of dispersion-induced packet-arrival jitter.

At step 224, controller 130 configures the various nodes in optical network 100 to transmit, route, and receive optical packets in accordance with the packet-routing schedule developed at steps 214-220, optionally with the time shifts of step 222.

At step 226, controller 130 monitors the arrival traffic at the ingress nodes and determines whether or not changes/fluctuations in the arrival traffic rates at the ingress nodes and/or traffic-distribution pattern with respect to the egress nodes exceed a predetermined threshold metric. If the threshold metric is exceeded, then the processing of method 200 is directed back to step 214, via steps 202 and 208. This redirection of the processing flow ensures that steps 204-206 and/or 210-212 are re-executed if that is justified or necessary for any of the reasons indicated above in the description pertaining to those steps. If the threshold metric is not exceeded, then the processing of method 200 is directed back to step 224 for the continued use of the presently operative packet-routing schedule.

While this invention has been described with reference to illustrative embodiments, this description is not intended to be construed in a limiting sense.

For example, in some embodiments, each node $110_i$ can be assigned a set of two or more carrier wavelengths, instead of a single carrier wavelength, as indicated above. In a representative embodiment, any given carrier wavelength is assigned to only one node $110_i$, which means that the set of two or more carrier wavelengths assigned to a node does not have any wavelengths in common with any other set of two or more carrier wavelengths assigned to any other node 110 in optical network 100. These embodiments generally require a node $110_i$ to have a transmitter module that can generate a WDM output signal by (i) independently modulating with data each of the assigned two or more carrier wavelengths and (ii) adding each of the resulting modulated WDM components to the wavelength multiplex in an appropriate one of optical-transport links 140. These embodiments may further require a node $110_i$ to have a receiver module that can receive, in the same time slot, a WDM signal having two or more modulated WDM components, each having a different respective carrier wavelength. With these additional transmitter/receiver capabilities, each modulated carrier wavelength can generally be routed through the hub node of the star-type layout in substantially the same manner as that described above in reference to embodiments in which a single respective carrier wavelength is assigned to each node 110.

In one embodiment, packet routing through a star-type routing layout, such as routing layout 300 (FIG. 3), can be implemented as an overlay over an already existing point-to-point or point-to-multipoint routing scheme operating over the whole optical mesh network, such as optical network 100 (FIG. 1). For example, using the existing optical-network infrastructure, a subset of the wavelengths can be routed using the already existing point-to-point or point-to-multipoint routing scheme, while another subset of the wavelengths can be routed using an embodiment of method 200 (FIG. 2).

In some embodiments, the identity of the hub node can be determined using a set of optimization criteria. Said optimization criteria may include but are not limited to (i) delay optimization, (ii) optimal utilization of line hardware, and (iii) maximum support or prioritization of the already operating point-to-point links.

Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term compatible means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting embodiments of the invention, as well as specific examples thereof, are intended to encompass equivalents thereof.

The functions of the various elements shown in the figures, including any functional blocks labeled as "processors" and "controllers" may be provided through the use of dedicated hardware as well as hardware capable of executing software in association with appropriate software. Explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. A machine-implemented method of routing optical signals in an optical network having a plurality of nodes connected to one another by a plurality of optical-transport links arranged according to a mesh topology, the method comprising:
   (A) generating an optical routing layout superimposable with the mesh topology of the optical network by:
      designating one of the plurality of nodes as a hub node;
      assigning a respective propagation path, through the plurality of optical-transport links, from each node configured to operate as an ingress node to the hub node; and
      assigning a respective propagation path, through the plurality of optical-transport links, from the hub node to each node configured to operate as an egress node, with said designating and assigning being performed in a manner that configures the optical routing layout to route any optical packet from a respective ingress node to a respective egress node via the hub node; and
   (B) generating, based on arrival traffic rates, a transmission schedule for transmitting optical packets, through the optical routing layout, from the respective ingress nodes to the respective egress nodes via the hub node, with said transmission schedule being generated in a manner that causes each ingress node in the optical routing layout to transmit at most one optical packet per time slot and each egress node in the optical routing layout to receive at most one optical packet per time slot.

2. The method of claim 1, wherein at least one optical-transport link of the plurality of optical-transport links is left out of the optical routing layout.

3. The method of claim 1, wherein, for at least one node pair consisting of an ingress node and an egress node, the plurality of optical-transport links provides an optical path connecting said node pair that is shorter than an optical path connecting said node pair via the hub node in the optical routing layout.

4. The method of claim 1,
   further comprising:
      (C) configuring an optical transmitter in an ingress node of the optical routing layout to generate outgoing optical packets using a respective carrier wavelength, with optical transmitters in different ingress nodes of the optical routing layout being configured to use different respective carrier wavelengths; and
   wherein step (A) comprises:
      (A1) assigning to each respective carrier wavelength a respective propagation path, through the optical routing layout, from the respective ingress node to the hub node, with different carrier wavelengths being assigned different respective propagation paths;
      (A2) assigning to each egress node of the optical routing layout a respective optical route connecting the hub node and the egress node in the optical routing layout; and
      (A3) configuring the hub node to direct optical packets destined for an egress node via the respective optical route assigned at step (A2) regardless of a carrier wavelength.

5. The method of claim 1, further comprising:
   (C) for each ingress node of the optical routing layout, measuring a respective transit-delay time in the optical routing layout for transmitting an optical packet from the ingress node to the hub node; and
   (D) adjusting the transmission schedule by shifting start times of packet transmissions at the respective ingress nodes by the respective transit-delay times.

6. The method of claim 5, further comprising:
   (E) further adjusting the transmission schedule by further shifting start times of packet transmissions at the respective ingress nodes of the optical routing layout to achieve approximate equalization of effects of chromatic dispersion on different carrier wavelengths in the optical routing layout.

7. The method of claim 1, wherein step (B) comprises:
   (B1) calculating an arrival traffic rate matrix for nodes of the optical routing layout;
   (B2) generating an integer-valued throughput allocation matrix based on a frame size F and the arrival traffic rate matrix calculated at step (B1), where F is a positive integer;
   (B3) decomposing the integer-valued throughput allocation matrix into a sum of F permutation matrices; and
   (B4) generating the transmission schedule based on the F permutation matrices.

8. The method of claim 7, wherein step (B3) comprises applying a Birkhoff-Von Neumann decomposition algorithm to find the F permutation matrices.

9. The method of claim 7, wherein step (B4) comprises identifying, based on each of the F permutation matrices, a respective set of node pairs in the optical routing layout, each node pair consisting of an ingress node configured to transmit an optical packet in a time slot corresponding to the permutation matrix and an egress node configured to receive said optical packet transmitted in said time slot corresponding to the permutation matrix.

10. The method of claim 7, further comprising:
    (C) generating, based on the F permutation matrices, a receiver-tuning schedule for egress nodes in the optical routing layout; and
    (D) generating, based on the F permutation matrices, a sequence of routing configurations for relay nodes in the optical routing layout.

11. The method of claim 10, further comprising:
    (E) generating at the ingress nodes, in accordance with the transmission schedule generated at step (B4), optical packets for transmission through the optical routing layout;
    (F) configuring relay nodes, in accordance with the sequence of routing configurations generated at step (D), to route through the optical routing layout the optical packets generated at step (E); and
    (G) wavelength-tuning, in accordance with the receiver-tuning schedule generated at step (C), optical receivers at the egress nodes in the optical routing layout to enable demodulation and decoding of the optical packets generated by the ingress nodes at step (E) and routed by the relay nodes at step (F).

12. The method of claim 10, wherein each of the transmission schedule, the receiver-tuning schedule, and the sequence of routing configurations is periodic with a period of F time slots.

13. The method of claim 7, further comprising:
    (C) monitoring changes in arrival traffic rates for the nodes of the optical routing layout; and
    (D) re-executing steps (B1)-(B4) if the changes exceed a predetermined threshold metric.

14. The method of claim 1, wherein the method is performed at a controller of the optical network.

15. An optical network comprising:
a plurality of nodes connected to one another by a plurality of optical-transport links arranged according to a mesh topology, wherein:
  each node of the plurality of nodes is configurable to function as an ingress node and as an egress node; and
  at least some nodes of the plurality of nodes are configurable to function as relay nodes; and
a network controller operatively connected to the plurality of nodes and configured to:
  generate an optical routing layout superimposable with the mesh topology of the optical network by:
    designating one of the plurality of nodes as a hub node;
    assigning a respective propagation path, through the plurality of optical-transport links, from each node configured to operate as an ingress node to the hub node; and
    assigning a respective propagation path, through the plurality of optical-transport links, from the hub node to each node configured to operate as an egress node, with said designating and assigning being performed in a manner that configures the optical routing layout to route any optical packet from a respective ingress node to a respective egress node via the hub node; and
  generate, based on arrival traffic rates, a transmission schedule for transmitting optical packets, through the optical routing layout, from the respective ingress nodes to the respective egress nodes via the hub node, with said transmission schedule being generated in a manner that causes each ingress node in the optical routing layout to transmit at most one optical packet per time slot and each egress node in the optical routing layout to receive at most one optical packet per time slot.

16. The optical network of claim 15,
wherein the hub node comprises a reconfigurable optical add/drop multiplexer configured to route optical packets based on the transmission schedule; and
wherein a routed optical packet remains optical, without undergoing an optical-to-electrical conversion at any point along a corresponding route through the optical routing layout, between the respective ingress node and the respective egress node.

17. The optical network of claim 15, wherein at least one optical-transport link of the plurality of optical-transport links is left out of the optical routing layout.

18. The optical network of claim 15, wherein, for at least one node pair consisting of an ingress node and an egress node, the plurality of optical-transport links provides an optical path connecting said node pair that is shorter than an optical path connecting said node pair via the hub node in the optical routing layout.

19. The optical network of claim 15, wherein the network controller is further configured to:
configure an optical transmitter in an ingress node of the optical routing layout to generate outgoing optical packets using a respective carrier wavelength, with optical transmitters in different ingress nodes of the optical routing layout being configured to use different respective carrier wavelengths;
assign to each respective carrier wavelength a respective propagation path, through the optical routing layout, from the respective ingress node to the hub node, with different carrier wavelengths being assigned different respective propagation paths;
assign to each egress node of the optical routing layout a respective optical route connecting the hub node and the egress node in the optical routing layout; and
configure the hub node to direct optical packets destined for an egress node via the respective assigned optical route regardless of a carrier wavelength.

20. The optical network of claim 15, wherein:
each ingress node of the optical routing layout is characterized by a respective transit-delay time in the optical routing layout, said respective transit-delay time representing optical-packet travel time from the ingress node to the hub node; and
the network controller is further configured to adjust the transmission schedule by shifting start times of packet transmissions at the respective ingress nodes by the respective transit-delay times.

21. A non-transitory machine-readable medium, having encoded thereon program code, wherein, when the program code is executed by a controller of an optical network having a plurality of nodes connected to one another by a plurality of optical-transport links arranged according to a mesh topology, the controller implements a method of routing optical signals in said optical network, the method comprising:
(A) generating an optical routing layout superimposable with the mesh topology of the optical network by:
  designating one of the plurality of nodes as a hub node;
  assigning a respective propagation path, through the plurality of optical-transport links, from each node configured to operate as an ingress node to the hub node; and
  assigning a respective propagation path, through the plurality of optical-transport links, from the hub node to each node configured to operate as an egress node, with said designating and assigning being performed in a manner that configures the optical routing layout to route any optical packet from a respective ingress node to a respective egress node via the hub node; and
(B) generating, based on arrival traffic rates, a transmission schedule for transmitting optical packets, through the optical routing layout, from the respective ingress nodes to the respective egress nodes via the hub node, with said transmission schedule being generated in a manner that causes each ingress node in the optical routing layout to transmit at most one optical packet per time slot and each egress node in the optical routing layout to receive at most one optical packet per time slot.

* * * * *